(12) United States Patent
Otsuka et al.

(10) Patent No.: US 12,163,209 B2
(45) Date of Patent: Dec. 10, 2024

(54) AUTOMOBILE UNDERCARRIAGE PART

(71) Applicant: NIPPON STEEL CORPORATION, Tokyo (JP)

(72) Inventors: Kenichiro Otsuka, Tokyo (JP); Masafumi Azuma, Tokyo (JP); Yoichiro Mori, Tokyo (JP); Shinji Kodama, Tokyo (JP); Masahiro Matsuba, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 547 days.

(21) Appl. No.: 17/442,803

(22) PCT Filed: Mar. 27, 2020

(86) PCT No.: PCT/JP2020/014216
§ 371 (c)(1),
(2) Date: Sep. 24, 2021

(87) PCT Pub. No.: WO2020/196875
PCT Pub. Date: Oct. 1, 2020

(65) Prior Publication Data
US 2022/0220595 A1 Jul. 14, 2022

(30) Foreign Application Priority Data
Mar. 27, 2019 (JP) .................... 2019-061001

(51) Int. Cl.
*C22C 38/14* (2006.01)
*B23K 35/30* (2006.01)
(Continued)

(52) U.S. Cl.
CPC .......... *C22C 38/14* (2013.01); *B23K 35/3053* (2013.01); *C22C 38/02* (2013.01);
(Continued)

(58) Field of Classification Search
CPC .......... B23K 2101/006; B23K 2101/18; B23K 2103/04; B23K 35/3053; B23K 9/0026;
(Continued)

(56) References Cited

U.S. PATENT DOCUMENTS
2016/0008906 A1    1/2016  Zeniya et al.

FOREIGN PATENT DOCUMENTS
JP    8-33982 A    2/1996
JP    8-33997 A    2/1996
(Continued)

OTHER PUBLICATIONS
NPL: on-line translation of JP 2006051515 A, Feb. 2006 (Year: 2006).*

*Primary Examiner* — Jie Yang
(74) *Attorney, Agent, or Firm* — Birch, Stewart, Kolasch & Birch, LLP

(57) ABSTRACT

An automobile undercarriage part of the present invention is an automobile undercarriage part including a welded joint in which a first steel sheet and a second steel sheet are overlapped and a fillet weld is formed between an end surface of the first steel sheet and a surface of the second steel sheet, in which a chemical composition of a weld metal that forms the welded joint contains, with respect to a total mass of the weld metal, by mass %, C: 0.02% to 0.20%, Si: more than 0% to less than 0.10%, Mn: 0.3% to 2.0%, Al: 0.002% to 0.30%. Ti: 0.005% to 0.30%, P: more than 0% to 0.015%, and S: more than 0% to 0.030%, and the following formula (1) and formula (2) are satisfied.

$$[Al]+[Ti]>0.05 \quad \text{Formula (1)}$$

$$7\times[Mn]-112\times[Ti]-30\times[Al]\leq 4.0 \quad \text{Formula (2)}$$

5 Claims, 1 Drawing Sheet

LOWER ARM

(51) Int. Cl.
    *C22C 38/02*     (2006.01)
    *C22C 38/04*     (2006.01)
    *C22C 38/06*     (2006.01)
    *B23K 103/04*     (2006.01)

(52) U.S. Cl.
    CPC .............. *C22C 38/04* (2013.01); *C22C 38/06* (2013.01); *B23K 2103/04* (2018.08)

(58) Field of Classification Search
    CPC .............. B23K 9/173; B60G 2206/122; B60G 2206/722; B60G 2206/8201; C22C 38/002; C22C 38/02; C22C 38/04; C22C 38/06; C22C 38/08; C22C 38/12; C22C 38/14; C22C 38/16; C22C 38/20; C22C 38/28; C22C 38/38; C22C 38/50
    USPC ........................................................ 420/103
    See application file for complete search history.

(56) References Cited

FOREIGN PATENT DOCUMENTS

| | | | |
|---|---|---|---|
| JP | 8-103884 A | | 4/1996 |
| JP | 2006051515 A | * | 2/2006 |
| JP | 2016-55659 A | | 4/2016 |
| JP | 2018-126755 A | | 8/2018 |
| JP | 2018-144077 A | | 9/2018 |
| WO | WO 2014/126246 A1 | | 8/2014 |

* cited by examiner

AUTOMOBILE UNDERCARRIAGE PART

TECHNICAL FIELD OF THE INVENTION

The present invention relates to an automobile undercarriage part. The present invention particularly relates to an automobile undercarriage part having a welded joint in which the strength and corrosion resistance of a weld metal are excellent.

Priority is claimed on Japanese Patent Application No. 2019-061001, filed in Japan on Mar. 27, 2019, the content of which is incorporated herein by reference.

RELATED ART

Automobile undercarriage parts are usually manufactured by performing lap welding on a plurality of steel materials through gas shielded arc welding or the like.

The standards for automobile corrosion resistance are becoming stricter year by year, and a need to suppress red rust particularly in joint portions (arc welding portion) in undercarriage parts such as arms, subframes, and beams is intensifying. The parts include a variety of lower arms, a variety of upper arms, toe control arms, trailing arms, torsion beams, carriers, subframes, side rails, cabs, underrun protectors, wheels, and floor cloths.

After these automobile undercarriage parts are manufactured by performing arc welding on a plurality of steel members using welding wires, painting is performed. In this painting, when a painting defect occurs on the surface of a weld metal, there has been a case where not only does the appearance become poor, but also the corrosion resistance deteriorates. In addition, even when automobile undercarriage parts are well painted to look good, if a painting defect such as flaking or exfoliation of paint occurs, there has been a case where red rust occurs between oxide slag on the weld metal and the paint membrane.

Patent Document 1 discloses a gas shielded metal arc welding method that enhances corrosion resistance after painting in a weld or a vicinity thereof, the method being a method of performing gas shielded metal arc welding on a carbon steel base metal that is to be electrodeposition-painted after welding using a steel welding wire, in which a welding wire having a composition that makes the total amount of Si in a base metal and the welding wire reach 0.04% to 0.2% by weight % and makes the total amount of Mn in the base metal and the welding wire reach 0.5% or more is used.

According to this technique of Patent Document 1, it is considered that corrosion resistance after painting in a weld formed by gas shielded metal arc welding or a vicinity thereof can be enhanced by suppressing the formation of insulating Si slag.

PRIOR ART DOCUMENT

Patent Document

[Patent Document 1] Japanese Unexamined Patent Application, First Publication No. H8-33997

DISCLOSURE OF THE INVENTION

Problems to be Solved by the Invention

However, in the case of simply reducing Si as in the technique of Patent Document 1, there have been no studies regarding the securement of the strength of weld metal. Therefore, it has been difficult to apply this technique to automobile undercarriage parts that require a high strength of 440 MPa or higher.

The present invention has been made in view of the above-described circumstances, and an object of the present invention is to provide an automobile undercarriage part having a welded joint in which the strength and corrosion resistance of a weld metal are excellent.

Means for Solving the Problem

Specific methods of the present invention are as described below.

[1] A first aspect of the present invention is an automobile undercarriage part including a welded joint in which a first steel sheet and a second steel sheet are overlapped and a fillet weld is formed between an end surface of the first steel sheet and a surface of the second steel sheet. A chemical composition of a weld metal that forms the welded joint contains, with respect to a total mass of the weld metal, by mass %, C: 0.02% to 0.20%, Si: more than 0% to less than 0.10%, Mn: 0.3% to 2.0%, Al: 0.002% to 0.30%. Ti: 0.005% to 0.30%, P: more than 0% to 0.015%, S: more than 0% to 0.030%. Cu: 0% to 0.50%, Cr: 0% to 1.5%, Nb: 0% to 0.3%, V: 0% to 0.3%, Mo: 0% to 1.0%, Ni: 0% to 2.5%, B: 0% to 0.005%, and a remainder comprising iron and impurities, and the following formula (1) and formula (2) are satisfied.

$$[Al]+[Ti]>0.05 \qquad \text{Formula (1)}$$

$$7\times[Mn]-112\times[Ti]-30\times[Al]\leq 4.0 \qquad \text{Formula (2)}$$

Here, [Al], [Ti], and [Mn] mean an amount of each component by mass % with respect to the total mass of the weld metal.

[2] The automobile undercarriage part according to [1], in which the chemical composition of the weld metal may contain, with respect to the total mass of the weld metal, by mass %, one or more of Cu: 0.05% to 0.50%, Cr: 0.05% to 1.5%, Nb: 0.005% to 0.3%, V: 0.005% to 0.3%, Mo: 0.05% to 1.0%, Ni: 0.05% to 2.5%, and B: 0.0005% to 0.005%.

[3] The automobile undercarriage part according to [1] or [2], in which a sheet thickness of the first steel sheet in which the fillet weld is to be formed on an end surface may be 0.8 mm or more and 4.5 mm or less.

[4] The automobile undercarriage part according to any one of [1] to [3], in which a tensile strength of the first steel sheet and the second steel sheet may be 780 MPa or lower.

Effects of the Invention

According to the undercarriage part according to the present invention, since the composition of the weld metal is appropriately controlled, it is possible to exhibit an excellent strength and excellent corrosion resistance in the weld metal in the welded joint.

EMBODIMENTS OF THE INVENTION

As a result of intensive studies regarding measures for solving the above-described problem, the present inventors and the like obtained the following findings.
- (A) In a case where the Si content of a weld metal is large, Si-based slag occurs, a painting defect occurs at the Si-based slag occurrence position, and red rust is likely to occur.
- (B) One of the causes for a decrease in the strength of the weld metal in the case of reducing the Si content of the weld metal is the formation of coarse ferrite due to the lack of deoxidation.
- (C) In a case where the Al content and the Ti content of the weld metal are increased more than ever, it is possible to suppress the formation of coarse ferrite in the weld metal.
- (D) In a case where Al and Ti are made to coexist in the weld metal, a red rust suppression effect can be obtained.
- (E) It is possible to suppress red rust by appropriately controlling the amounts of Mn, Ti, and Al.

The present invention has been made based on the above-described findings. Hereinafter, an automobile undercarriage part according to an embodiment of the present invention will be described in detail.

Figure 1:
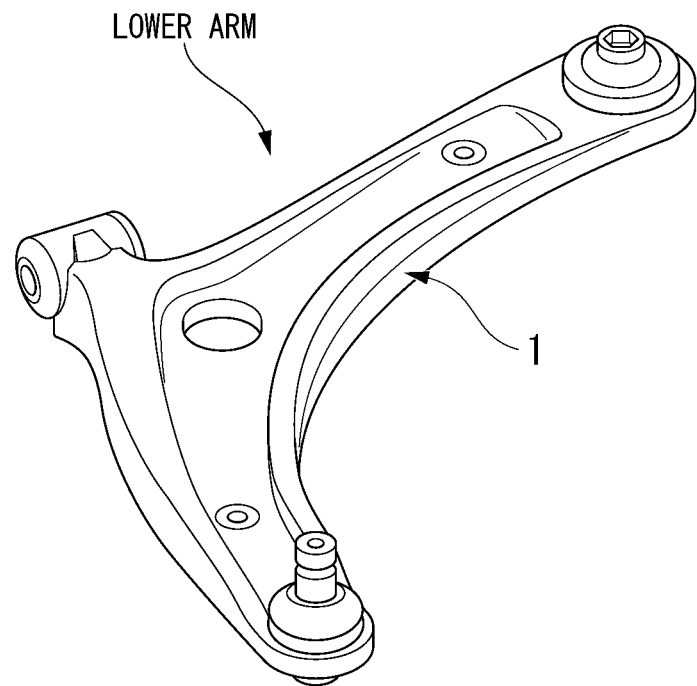
FIG. 1 is a perspective view of an automobile undercarriage part according to the present embodiment.

The automobile undercarriage part according to the present embodiment is, for example, a variety of lower arms, a variety of upper arms, a toe control arm, a trailing arm, a torsion beam, a carrier, a subframe, a side rail, a cab, an underrun protector, a wheel, and a floor cloth. FIG. 1 is a perspective view of a lower arm which is an automobile undercarriage part, and, as shown in FIG. 1, the automobile undercarriage part according to the present embodiment includes a welded joint 1 at which two steel sheet are overlapped and welded.

Figure 2:
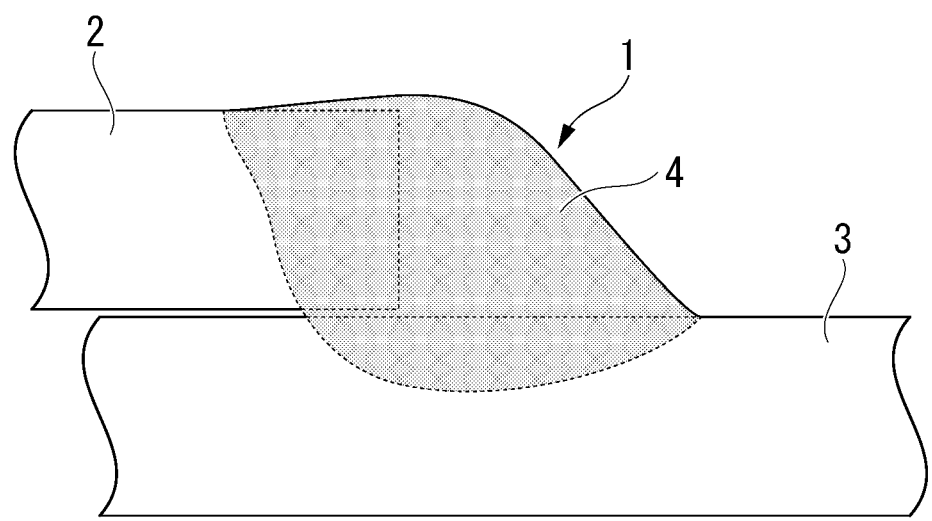
FIG. 2 is a schematic cross-sectional view showing a welded joint of the automobile undercarriage part according to the present embodiment.

FIG. 2 is a schematic cross-sectional view showing the welded joint 1 of the automobile undercarriage part in FIG. 1. As shown in FIG. 2, the welded joint 1 is configured by overlapping two steel sheets 2 and 3 (a first steel sheet and a second steel sheet) and forming a fillet weld 4 between an end surface of one steel sheet 2 and a surface of the other steel sheet 3.

The fillet weld 4 is formed by performing arc welding on the two steel sheets 2 and 3 using a welding wire.

The two steel sheets 2 and 3 may be steel sheets of the same kind or steel sheets of different kinds. The sheet thickness of the steel sheet 2 in which the fillet weld 4 is to be formed on the end surface is preferably 0.8 mm or more and 4.5 mm or less.

When the sheet thickness of the steel sheet 2 is 0.8 mm or more, the occurrence of a welding defect during arc welding is suppressed, and, when the sheet thickness of the steel sheet 2 is 4.5 mm or less, a red rust suppression effect can be obtained. The sheet thickness of the steel sheet 2 is preferably 1.4 mm or more and more preferably 2.0 mm or more. In addition, the sheet thickness of the steel sheet 2 is preferably 4.0 mm or less and more preferably 3.5 mm or less.

Each of the sheet thicknesses of the two steel sheets 2 and 3 is more preferably 0.8 mm or more and 4.5 mm or less.

When the sheet thicknesses of the steel sheets 2 and 3 are 0.8 mm or more, the occurrence of a welding defect during arc welding is suppressed, and, when the sheet thicknesses of the steel sheets 2 and 3 is 4.5 mm or less, it is possible to suppress the weight. The sheet thicknesses of the steel sheets 2 and 3 are preferably 1.4 mm or more and more preferably 2.0 mm or more. In addition, the sheet thicknesses of the steel sheets 2 and 3 are preferably 4.0 mm or less and more preferably 3.5 mm or less.

In addition, the tensile strengths of the steel sheets 2 and 3 may be 780 MPa or lower. On the other hand, the lower limit of the tensile strengths of the steel sheets 2 and 3 is not particularly limited and may be 440 MPa or higher.

The composition of the weld metal 4 for the welded joint 1 can be adjusted with the steel sheet component and the welding wire component. Hereinafter, each composition of the weld metal 4 will be described.

In the following description, the expression "corrosion resistance being satisfied" means that no red rust occurs at the time of evaluating the corrosion resistance with 50 cycles of a combined cyclic test (CCT, 5% NaCl, wet rate: 50%) specified in the JASO method M610.

The expression "strength being satisfied" means that, when a tensile test is performed on a welded test piece, the welded test piece fractures from the base metal, not from the weld metal.

The expression "weld metal" means a metal formed by the melting and mixing of a steel sheet base metal and a welding wire.

The chemical composition of the weld metal will be expressed by mass %, which is the proportion in the total mass of the weld metal, and the denotation "mass %" will be simply expressed as "%" in the description.

The chemical composition of the weld metal can be measured by emission spectroscopy with high frequency inductively coupled plasma (ICP). Specifically, (1) a region of the weld metal is specified in advance by visually observing a cross section perpendicular to the longitudinal direction in the longitudinal direction center portion of the weld, (2) the chips of the weld metal are collected by cutting the region with a drill, and (3) the chips are measured as a sample by emission spectroscopy with high frequency inductively coupled plasma (ICP).

[C: 0.02% to 0.20%]

C has an action of stabilizing arc and refining droplets. When the C content is less than 0.02%, droplets become large, arc becomes unstable, and the amount of spatters occurring increases. As a result, bead shapes become uneven and defective, and thus red rust occurs. The reason for the occurrence of red rust due to the bead shape defect is that welding slag is likely to occur in recessed parts attributed to the defect and water, mud containing moisture, or the like, which causes red rust, is likely to gather. In addition, when the C content is less than 0.02%, a tensile strength cannot be obtained in the weld metal, and it is not possible to obtain a desired tensile strength. Therefore, the lower limit of C is 0.02% or more, preferably 0.04% or more, and more preferably 0.06% or more.

On the other hand, when the C content exceeds 0.20%, the weld metal hardens, which degrades cracking resistance and makes the weld metal likely to fracture. Therefore, the upper limit of C is 0.20% and preferably 0.15%.

[Si: More than 0% to Less than 0.10%]

Si is contained in the welding wire or the base metal as a deoxidizing element. In particular, Si in the welding wire accelerates the deoxidation of molten pool and thereby improves the tensile strength of the weld metal. However, in the case of being excessively contained, non-conductive slag is formed, and a painting defect occurs.

Therefore, the upper limit of Si is less than 0.10%, preferably less than 0.09%, and more preferably less than 0.08%. The lower limit may be more than 0%, but is preferably 0.01% or more from the viewpoint of the manufacturing cost and the securement of the bead shape stability during welding.

[Mn: 0.3% to 2.0%]

Mn is also, similar to Si, a deoxidizing element and is an element that accelerates the deoxidation of the molten pool during arc welding and improves the tensile strength of the weld metal. When the Mn content is low, it is not possible to sufficiently secure the tensile strength of the weld metal, and the weld metal is likely to fracture. Therefore, the lower limit of Mn is 0.3% or more and preferably 0.5% or more.

On the other hand, when Mn is excessively contained, the viscosity of molten metal becomes high, and, in a case where the welding rate is fast, it is not possible for the molten metal to appropriately flow into a welded portion, a humping bead is formed, and a bead shape defect is likely to occur. As a result, bead shapes become uneven and defective, and thus red rust occurs. Therefore, the upper limit of Mn is 2.0% or less and preferably 1.5% or less.

[Al: 0.002% to 0.30%]

Al is a strong deoxidizing element and has an effect of accelerating the deoxidation of the molten metal during arc welding to suppress the occurrence of a blowhole. Therefore, the lower limit of the Al content is 0.002%, preferably 0.01%, and more preferably 0.02%.

On the other hand, when the Al content is excessive, the amount of Al-based slag increases, and red rust is likely to occur between the slag and the weld metal. Therefore, the upper limit of the Al content of the weld metal is 0.30%, preferably 0.25%, and more preferably 0.20%.

[Ti: 0.005% to 0.300%]

Ti is a deoxidizing element and thus has an effect of suppressing the occurrence of a blowhole. Therefore, the lower limit of the Ti content is 0.005%, preferably 0.01%, and more preferably 0.05%.

On the other hand, in a case where Ti is excessively contained, the amount of Ti-based slag increases, the adhesion between the Ti-based slag and the weld metal deteriorates, and the Ti-based slag is likely to exfoliate. Therefore, red rust is likely to occur at a place where the Ti-based slag has exfoliated. Therefore, the upper limit of the Ti content is 0.30%, preferably 0.25%, and more preferably 0.20%.

[Synergistic Effect of Coexistence of Al and Ti]

Al and Ti are both elements that suppress Si-based slag and form Al-based slag and Ti-based slag and are elements that contribute to the suppression of a painting defect. However, in a case where the amount of only any one of Al and Ti is the lower limit or more, only Al-based slag or only Ti-based slag tends to aggregate on a weld bead. In a case where this slag aggregates, even when there is no painting defect on the weld bead, a cavity is likely to be formed between the weld metal and the slag, and red rust occurs from this cavity. That is, when both Al-based slag and Ti-based slag are formed, the aggregation of the same slag is suppressed, and consequently, red rust is suppressed. Therefore, in the present invention, excellent corrosion resistance can be obtained by providing a component system containing both Al to Ti to the weld metal.

[Al, Ti]

The amounts of Al and Ti satisfy the following formula (1).

$$[Al]+[Ti]>0.05 \quad \text{Formula (1)}$$

Both Al and Ti are capable of sufficiently securing the strength of the weld metal by suppressing the formation of coarse ferrite. In a case where the total amount of Al and Ti is 0.05% or less, even when no blowhole occurs, ferrite in the weld metal is likely to coarsen, the strength of the weld metal can not be sufficiently obtained, and the weld metal is likely to fracture. Therefore, the lower limit of the total amount of Al and Ti is more than 0.05%, preferably 0.10%, and more preferably 0.15%.

The upper limit of Al+Ti is not particularly limited, but is preferably 0.60%, which is calculated from the upper limit of each of Al and Ti. However, when the upper limit of Al+Ti is 0.30% or less, the occurrence of Al-based slag and Ti-based slag is suppressed, and the occurrence of red rust between the Al-based slag and the Ti-based slag and the weld metal is suppressed, which is preferable. The upper limit of Al+Ti is more preferably 0.20%.

[Mn, M, Al]

In addition, the amounts of Mn, Ti, and Al satisfy the following formula (2).

$$7\times[Mn]-112\times[Ti]-30\times[Al]\leq 4.0 \quad \text{Formula (2)}$$

As a result of investigating the presence or absence of the occurrence of red rust between slag and a weld metal in weld metals having a variety of component systems, the inventors clarified that, when the value of $7\times[Mn]-112\times[Ti]-30\times[Al]$, which is an index regarding the occurrence of red rust, exceeds 4.0, red rust occurs at an early stage, and corrosion resistance is poor. Therefore, in the above formula, the upper limit is set to 4.0.

The lower limit is not particularly limited and is −40.5, which is calculated from the lower limit of Mn and the upper limits of Al and Ti.

In the formula (1) and the formula (2), [Al], [Ti], and [Mn] mean the amount of each component by mass % with respect to the total mass of the weld metal.

[P: More than 0% to 0.015%]

P is an element that is usually contained in steel by accident as an impurity and ordinarily contained in steel sheets and welding wires and is thus also contained in weld metals. Here, P is one of key elements that cause the hot cracking of weld metals and is thus desirably suppressed as much as possible. When the P content exceeds 0.015%, since the hot cracking of the weld metal becomes significant, the upper limit of the P content of the weld metal is 0.015% or less.

The lower limit of the P content is not particularly limited and is thus more than 0%, but may be 0.001% from the viewpoint of the dephosphorization cost and the productivity.

[S: More than 0% to 0.030%]

S is also, similar to P, an element that is usually contained in steel by accident as an impurity and ordinarily contained in welding wires and is thus also contained in weld metals. Here, S is an element that impairs the cracking resistance of weld metals and is preferably suppressed as much as possible. When the S content exceeds 0.030%, since the cracking resistance of the weld metal deteriorates, the S content of the weld metal is 0.030% or less.

The lower limit of the S content is not particularly limited and is thus more than 0%, but may be 0.001% from the viewpoint of the desulfurization cost and the productivity.

Cu, Cr, Nb, V, Mo, Ni, and B are not essential elements, and one or more thereof may be contained at the same time as necessary. An effect that can be obtained by containing each element and the upper limit will be described. In a case where these elements are not contained, the lower limit is 0%.

[Cu: 0% to 0.50%]

Since there are cases where Cu derives from Cu plates on welding wires and is contained in weld metals, 0.05% or more of Cu may be contained. On the other hand, when the Cu content becomes excessive, since weld cracking is likely to occur, the upper limit of Cu is 0.50% or less.

[Cr: 0% to 1.5%]

0.05% or more of Cr may be contained in order to enhance the hardenability of the weld and improve the tensile strength. On the other hand, when Cr is excessively contained, the elongation of the weld deteriorates. Therefore, the upper limit of Cr is 1.5% or less.

[Nb: 0% to 0.3%]

0.005% or more of Nb may be contained in order to enhance the hardenability of the weld and improve the tensile strength. On the other hand, when Nb is excessively contained, the elongation of the weld deteriorates. Therefore, the upper limit of Nb is 0.3% or less.

[V: 0% to 0.3%]

0.005% or more of V may be contained in order to enhance the hardenability of the weld and improve the tensile strength. On the other hand, when V is excessively contained, the elongation of the weld deteriorates. Therefore, the upper limit of V is 0.3% or less.

[Mo: 0% to 1.0%]

0.05% or more of Mo may be contained in order to enhance the hardenability of the weld and improve the tensile strength. On the other hand, when Mo is excessively contained, the elongation of the weld deteriorates. Therefore, the upper limit of Mo is 1.0% or less.

[Ni: 0% to 2.5%]

0.05% or more of Ni may be contained in order to improve the tensile strength and elongation of the weld. On the other hand, in a case where Ni is excessively contained, weld cracking is likely to occur. Therefore, the upper limit of Ni is 2.5% or less. The upper limit is preferably 2.0% or less.

[B: 0% to 0.005%]

0.0005% or more of B may be contained in order to enhance the hardenability of the weld and improve the tensile strength. On the other hand, when B is excessively contained, the elongation of the weld deteriorates. Therefore, the upper limit of B is 0.005%. The upper limit is preferably 0.003% or less.

The remainder of the components described above comprises Fe and impurities. The impurities refer to components that are contained in raw materials or components that are contained by accident in manufacturing processes that are not components intentionally contained in the weld metal or components that are permitted to an extent that the automobile undercarriage part according to the present embodiment is not adversely affected.

Hitherto, the automobile undercarriage part according to the present embodiment has been described. The kind of a steel sheet that forms the base metal for the automobile undercarriage part according to the present embodiment is not particularly limited, but is preferably a steel sheet containing components of C: 0.020% to 0.30%, Si: 0% to less than 0.05%, Mn: 0.30% to 3.00%. P: less than 0.05%, and S: less than 0.010%. In addition, the steel sheet may be a steel sheet containing, in addition to the above-described components, optional components such as Al and Ti. In addition, the tensile strength of the steel sheet is not particularly limited: however, when a steel sheet of 440 MPa or higher is used as the base metal, an effect of securing the strength and corrosion resistance of the weld metal in the undercarriage parts according to the present embodiment at a high level is further exhibited.

EXAMPLES

Hereinafter, the effect of the present invention will be specifically described using examples.

Lap fillet arc welding was performed using a variety of welding wires on the following steel sheets a, the following steel sheets b, the following steel sheets c, the following steel sheets d, or the following steel sheets e to manufacture welded joints, and weld metals were evaluated. One and the other steel sheets were caused to adhere to each other in an overlap space set to 15 mm, and the sheet thickness of the steel sheet was set to 2.6 mm to 5.0 mm. Regarding the welding position, a weld line was set to be horizontal, and the inclination angle α of the other steel sheet was set to 0°. As the welding method, a pulse MAG arc welding method was adopted, the inclination angle (raising angle) of the welding torch was set to 60°, and Ar gas containing 20 vol % of $CO_2$ was mainly used as the shielding gas. In addition, as the shielding gas, Ar gas containing 3% of $O_2$ and Ar gas containing 20% of $CO_2$ and 2% of $O_2$ were also used. The wire tip aim was the corner portion that was configured by the end surface of the one steel sheet and the surface of the other steel sheet.

The components of the weld metals were adjusted by using solid wires of a variety of component systems as the welding wires.

The tensile strength, sheet thickness, and main components of each steel sheet are as described below.

(Steel Sheet a)
  Tensile Strength: 270 MPa
  Sheet thickness: 3.2 mm
  Components: C=0.040%, Si=0.01%. Mn=0.30%, P=0.010%, and S=0.005%

(Steel Sheet b)
  Tensile Strength: 440 MPa
  Sheet thickness: 3.2 mm
  Components: C=0.150%, Si=0.01%. Mn=0.50%, P=0.010%, S=0.005%, and Al=0.02%

(Steel Sheet c)
  Tensile Strength: 590 MPa
  Sheet thickness: 2.9 mm
  Components: C=0.050%, Si=0.02%, Mn=1.25%. P=0.010%, S=0.005%. Al=0.30%, and Ti=0.05%

(Steel Sheet d)
  Tensile Strength: 780 MPa
  Sheet thickness: 2.6 mm
  Components: C=0.045%, Si=0.02%, Mn=1.55%, P=0.010%, S=0.005%, Al=0.30%, and Ti=0.13%

(Steel Sheet e)
  Tensile Strength: 780 MPa
  Sheet thickness: 5.0 mm
  Components: C=0.045%, Si=0.08%, Mn=1.50%, P=0.007%, S=0.005%, Al=0.05%, and Ti=0.07%

For the welded joints obtained as described above, the chemical compositions of the weld metals were measured.

Specifically, the chemical composition of the weld metal was measured by (1) specifying a region of the weld metal in advance by visually observing a cross section perpendicular to the longitudinal direction in the longitudinal direction center portion of the weld, (2) collecting the chips of the weld metal by cutting the region with a drill, and (3) measuring the chips as a sample by emission spectroscopy with high frequency inductively coupled plasma (ICP).

Table 1 to Table 3 show the amount of each component and the values of the formula (1) and the formula (2). Numerical values outside the scope of the present invention are underlined. In addition, for components that were not added, cells in the table were left blank.

In addition, Table 1 to Table 3 also shows the strength (fracturing position) and the evaluation result of red rust for each experimental example.

TABLE 1

| Experiment No. | Steel type | C | Si | Mn | Al | Ti | P | S | Cu | Cr | Nb | V | Mo | Ni | B |
|---|---|---|---|---|---|---|---|---|---|---|---|---|---|---|---|
| | | (mass %) Remainder being Fe and impurity | | | | | | | | | | | | | |
| 1 | b | 0.12 | 0.09 | 0.7 | 0.01 | 0.05 | 0.009 | 0.007 | | | | | | | |
| 2 | d | 0.04 | 0.09 | 1.5 | 0.05 | 0.07 | 0.007 | 0.004 | | | | | | | |
| 3 | a | 0.06 | 0.04 | 0.4 | 0.03 | 0.09 | 0.009 | 0.004 | | | | | | 0.10 | |
| 4 | b | 0.16 | 0.08 | 1.1 | 0.10 | 0.05 | 0.010 | 0.008 | | | | | | | |
| 5 | c | 0.05 | 0.01 | 1.2 | 0.10 | 0.06 | 0.004 | 0.009 | | | | | | | |
| 6 | c | 0.09 | 0.08 | 0.4 | 0.06 | 0.05 | 0.009 | 0.015 | | | | | | 0.17 | |
| 7 | c | 0.08 | 0.03 | 1.8 | 0.05 | 0.07 | 0.010 | 0.004 | | | | | | | |
| 8 | d | 0.06 | 0.06 | 1.4 | 0.08 | 0.29 | 0.006 | 0.006 | | | | | | | |
| 9 | b | 0.14 | 0.05 | 0.6 | 0.03 | 0.14 | 0.009 | 0.011 | | | | | | | |
| 10 | b | 0.12 | 0.07 | 1.0 | 0.05 | 0.15 | 0.008 | 0.005 | | | | | | | 0.002 |
| 11 | d | 0.03 | 0.02 | 1.7 | 0.01 | 0.17 | 0.011 | 0.018 | | | | | | | |
| 12 | c | 0.08 | 0.09 | 1.1 | 0.09 | 0.06 | 0.011 | 0.004 | 0.08 | | 0.01 | | | | |
| 13 | c | 0.05 | 0.05 | 1.2 | 0.03 | 0.08 | 0.004 | 0.009 | | | | | | | |
| 14 | c | 0.04 | 0.05 | 1.5 | 0.06 | 0.05 | 0.009 | 0.005 | 0.20 | | | | | 0.15 | |

| Experiment No. | Formula (1) | Formula (2) | Fracturing position | Red rust 50 cycles | Red rust 100 cycles | Classification |
|---|---|---|---|---|---|---|
| 1 | 0.06 | −1.0 | OK | OK | OK | Invention Example |
| 2 | 0.12 | 1.2 | OK | OK | OK | Invention Example |
| 3 | 0.12 | −8.2 | OK | OK | OK | Invention Example |
| 4 | 0.15 | −0.9 | OK | OK | OK | Invention Example |
| 5 | 0.16 | −1.3 | OK | OK | OK | Invention Example |
| 6 | 0.11 | −4.6 | OK | OK | OK | Invention Example |
| 7 | 0.12 | 3.3 | OK | OK | OK | Invention Example |
| 8 | 0.37 | −25.1 | OK | OK | OK | Invention Example |
| 9 | 0.17 | −12.4 | OK | OK | OK | Invention Example |
| 10 | 0.20 | −11.3 | OK | OK | OK | Invention Example |
| 11 | 0.18 | −7.4 | OK | OK | OK | Invention Example |
| 12 | 0.15 | −1.7 | OK | OK | OK | Invention Example |
| 13 | 0.11 | −1.5 | OK | OK | OK | Invention Example |
| 14 | 0.11 | 3.1 | OK | OK | OK | Invention Example |

TABLE 2

| Experiment No. | Steel type | C | Si | Mn | Al | Ti | P | S | Cu | Cr | Nb | V | Mo | Ni | B |
|---|---|---|---|---|---|---|---|---|---|---|---|---|---|---|---|
| | | (mass %) Remainder being Fe and impurity | | | | | | | | | | | | | |
| 15 | d | 0.05 | 0.06 | 1.2 | 0.08 | 0.17 | 0.009 | 0.015 | | | | | | | |
| 16 | d | 0.07 | 0.07 | 1.3 | 0.10 | 0.12 | 0.009 | 0.005 | 0.09 | 0.07 | | | | | |
| 17 | d | 0.07 | 0.02 | 1.9 | 0.10 | 0.20 | 0.007 | 0.008 | 0.29 | | | | | | |
| 18 | d | 0.07 | 0.08 | 1.0 | 0.10 | 0.10 | 0.009 | 0.015 | 0.10 | | | 0.04 | | | |
| 19 | c | 0.05 | 0.07 | 1.3 | 0.28 | 0.09 | 0.006 | 0.005 | | | | | | | |
| 20 | c | 0.06 | 0.06 | 2.0 | 0.04 | 0.08 | 0.008 | 0.004 | 0.15 | | | | | | 0.004 |
| 21 | d | 0.05 | 0.01 | 1.5 | 0.10 | 0.11 | 0.009 | 0.005 | | | | | | | |
| 22 | c | 0.08 | 0.07 | 1.6 | 0.05 | 0.07 | 0.011 | 0.005 | | | 0.02 | | | | |
| 23 | c | 0.05 | 0.07 | 2.0 | 0.07 | 0.08 | 0.009 | 0.005 | 0.08 | | | | 0.12 | | |
| 24 | d | 0.05 | 0.05 | 1.5 | 0.10 | 0.10 | 0.009 | 0.007 | | | | | | | |
| 25 | c | 0.08 | 0.05 | 1.5 | 0.06 | 0.05 | 0.009 | 0.015 | | 0.08 | | | | | |
| 26 | c | 0.07 | 0.05 | 1.2 | 0.08 | 0.06 | 0.009 | 0.005 | | | | 0.05 | | | |
| 27 | d | 0.05 | 0.06 | 1.0 | 0.15 | 0.24 | 0.008 | 0.005 | | | | | | | |

| Experiment No. | Formula (1) | Formula (2) | Fracturing position | Red rust 50 cycles | Red rust 100 cycles | Classification |
|---|---|---|---|---|---|---|
| 15 | 0.25 | −13.0 | OK | OK | OK | Invention Example |

TABLE 2-continued

| | | | | | | |
|---|---|---|---|---|---|---|
| 16 | 0.22 | −7.3 | OK | OK | OK | Invention Example |
| 17 | 0.30 | −12.1 | OK | OK | OK | Invention Example |
| 18 | 0.20 | −7.2 | OK | OK | OK | Invention Example |
| 19 | 0.37 | −9.4 | OK | OK | OK | Invention Example |
| 20 | 0.12 | 3.8 | OK | OK | OK | Invention Example |
| 21 | 0.21 | −4.8 | OK | OK | OK | Invention Example |
| 22 | 0.12 | 1.9 | OK | OK | OK | Invention Example |
| 23 | 0.15 | 2.9 | OK | OK | OK | Invention Example |
| 24 | 0.20 | −3.7 | OK | OK | OK | Invention Example |
| 25 | 0.11 | 3.1 | OK | OK | OK | Invention Example |
| 26 | 0.14 | −0.7 | OK | OK | OK | Invention Example |
| 27 | 0.39 | −24.4 | OK | OK | OK | Invention Example |

TABLE 3

| Experiment No. | Steel type | C | Si | Mn | Al | Ti | P | S | Cu | Cr | Nb | V | Mo | Ni | B |
|---|---|---|---|---|---|---|---|---|---|---|---|---|---|---|---|
| | | | | | (mass %) Reminder being Fe and impurity | | | | | | | | | | |
| 28 | c | 0.05 | <u>0.12</u> | 1.6 | 0.05 | 0.07 | 0.009 | 0.004 | | | | | | | |
| 29 | c | 0.07 | <u>0.09</u> | 1.9 | 0.07 | 0.06 | 0.009 | 0.005 | | | | | | | |
| 30 | b | <u>0.21</u> | 0.04 | 0.4 | 0.08 | 0.06 | 0.009 | 0.015 | | | | | | | |
| 31 | b | <u>0.07</u> | 0.04 | 0.4 | 0.01 | 0.03 | 0.008 | 0.011 | | | | | | | |
| 32 | c | <u>0.01</u> | 0.05 | 1.5 | 0.07 | 0.06 | 0.009 | 0.005 | | | | | | | |
| 33 | d | 0.07 | 0.07 | <u>2.5</u> | 0.03 | 0.14 | 0.008 | 0.011 | | | | | | | |
| 34 | 6 | 0.05 | 0.05 | 1.5 | <u>0.37</u> | 0.10 | 0.005 | 0.005 | | | | | | | |
| 35 | a | 0.03 | 0.02 | 0.4 | <u>0.29</u> | <u>0.001</u> | 0.011 | 0.018 | | | | | | | |
| 36 | a | 0.05 | 0.05 | <u>0.2</u> | 0.05 | <u>0.07</u> | 0.007 | 0.005 | | | | | | | |
| 37 | b | 0.14 | 0.05 | <u>0.6</u> | 0.05 | <u>0.34</u> | 0.005 | 0.004 | | | | | | | |
| 38 | a | 0.05 | 0.01 | 1.8 | <u>0.001</u> | 0.11 | 0.009 | 0.005 | | | | | | | |
| 39 | e | 0.05 | 0.08 | 1.5 | 0.05 | 0.07 | 0.007 | 0.005 | | | | | | | |

| Experiment No. | Formula (1) | Formula (2) | Fracturing position | Red rust 50 cycles | Red rust 100 cycles | Classification |
|---|---|---|---|---|---|---|
| 28 | 0.12 | 1.9 | OK | NG | NG | Comparative Example |
| 29 | 0.13 | <u>4.5</u> | OK | NG | NG | Comparative Example |
| 30 | 0.14 | −6.3 | NG | OK | OK | Comparative Example |
| 31 | <u>0.04</u> | −0.9 | NG | OK | OK | Comparative Example |
| 32 | 0.13 | 1.7 | NG | NG | NG | Comparative Example |
| 33 | 0.17 | 0.9 | OK | NG | NG | Comparative Example |
| 34 | 0.47 | −11.8 | OK | NG | NG | Comparative Example |
| 35 | 0.29 | −6.0 | OK | NG | NG | Comparative Example |
| 36 | 0.12 | −7.9 | NG | OK | OK | Comparative Example |
| 37 | 0.39 | −35.4 | OK | NG | NG | Comparative Example |
| 38 | 0.11 | 0.2 | OK | NG | NG | Comparative Example |
| 39 | 0.12 | 1.2 | OK | OK | NG | Invention Example |

(Evaluation of Strength)

The strength was evaluated at the fracturing position in a joint tensile test. The tensile test was performed by overlapping the end portions in the longitudinal direction of two 25 mm×100 mm steel sheets as much as 15 mm, performing lap fillet welding, and pulling the steel sheets at a rate of a tensile rate of 10 mm/min in the longitudinal direction. The strength was evaluated as OK in a case where the fracturing position was the base metal and evaluated as NG in a case where the fracturing position was the weld metal.

(Evaluation of Red Rust)

The combined cyclic test (CCT, 5% NaCl, wet rate: 50%) specified in the JASO method M610 was performed 50 cycles and 100 cycles, and the presence or absence of red rust was evaluated. A case where red rust did not occur was regarded as OK, and a case where red rust occurred was regarded as NG.

Corrosion resistance was evaluated into the following three grades A, B, and C. A and B indicate that the corrosion resistance was satisfied, and C indicates that the corrosion resistance was not satisfied.

A: Both of the 50-cycle test and the 100-cycle test are OK.
B: The 50-cycle test is OK, but the 100-cycle test is NG.
C: Both of the 50-cycle test and the 100-cycle test are NG.

In Experiment Nos. 1 to 27 and 39 according to the present invention examples, since the compositions of the weld metals were appropriate, and thus the compositions of the weld metals were appropriately controlled, it was possible to obtain an excellent strength and excellent corrosion resistance in the weld metals. However, in Experiment No. 39 in which the sheet thickness of the steel sheet in which the fillet weld was to be formed on the end surface exceeded 4.5 mm, in the combined cyclic tests, red rust did not occur in the 50-cycle test, but red rust occurred in the 100-cycle test.

In Experiment No. 28 according to a comparative example, since the Si content of the weld metal was excessive, non-conductive slag was formed, and a painting defect occurred.

In Experiment No. 29 according to a comparative example, since the chemical composition of the weld metal did not satisfy the formula (2), it was not possible to suppress the occurrence of red rust.

In Experiment No. 30 according to a comparative example, since the C content of the weld metal was excessive, the weld metal hardened, and it was not possible to obtain a desired strength.

In Experiment No. 31 according to a comparative example, since the chemical composition of the weld metal did not satisfy the formula (1), it was not possible to sufficiently benefit the effect of suppressing the formation of coarse ferrite, and it was not possible to secure the strength of the weld metal.

In Experiment No. 32 according to a comparative example, since the C content of the weld metal was too low, it was not possible to obtain a tensile strength in the weld metal, and it was not possible to obtain a desired tensile strength. In addition, due to a bead shape defect, red rust occurred.

In Experiment No. 33 according to a comparative example, since the Mn content of the weld metal was excessive, due to a bead shape defect, red rust occurred.

In Experiment No. 34 according to a comparative example, since the Al content of the weld metal was excessive, Al-based slag increased, and red rust occurred between the Al-based slag and the weld metal.

In Experiment No. 35 according to a comparative example, since the Ti content of the weld metal was too low, and Al and Ti did not coexist, only Al-based slag aggregated on the weld bead, a cavity was formed between the weld metal and the Al-based slag, and red rust occurred from this cavity.

In Experiment No. 36 according to a comparative example, since the Mn content of the weld metal was too low, it was not possible to ensure the strength of the weld metal, and fracturing occurred in the weld metal.

In Experiment No. 37 according to a comparative example, since the Ti content of the weld metal was excessive, Ti-based slag increased, the adhesion of the Ti-based slag deteriorated, and the Ti-based slag exfoliated. Therefore, red rust occurred at a place where the Ti-based slag had exfoliated.

In Experiment No. 38 according to a comparative example, since the Al content of the weld metal was too low, and Al and Ti did not coexist, only Ti-based slag aggregated on the weld bead, a cavity was formed between the weld metal and the Ti-based slag, and red rust occurred from this cavity.

INDUSTRIAL APPLICABILITY

According to the present invention, it is possible to provide an automobile undercarriage part having a welded joint in which the strength and corrosion resistance of a weld metal are excellent, and the industrial applicability is high.

BRIEF DESCRIPTION OF THE REFERENCE SYMBOLS

1 Welded joint
2 First steel sheet
3 Second steel sheet
4 Fillet weld, weld metal

The invention claimed is:

1. An automobile undercarriage part comprising:
a welded joint in which a first steel sheet and a second steel sheet are overlapped and a fillet weld is formed between an end surface of the first steel sheet and a surface of the second steel sheet,
wherein a chemical composition of a weld metal that forms the welded joint contains, with respect to a total mass of the weld metal, by mass %:
C: 0.02% to 0.20%,
Si: more than 0% to less than 0.09%;
Mn: 0.3% to 2.0%;
Al: 0.002% to 0.30%;
Ti: 0.005% to 0.30%;
P: more than 0% to 0.015%;
S: more than 0% to 0.030%;
Cu: 0% to 0.50%;
Cr: 0% to 1.5%;
Nb: 0% to 0.3%;
V: 0% to 0.3%;
Mo: 0% to 1.0%;
Ni: 00% to 2.5%;
B: 0% to 0.005%; and
a remainder consisting of iron and impurities, and
the following formula (1) and formula (2) are satisfied, $$[Al]+[Ti]>0.05 \quad \text{Formula (1)}$$

$$7\times[Mn]-112\times[Ti]-30\times[Al]\leq 4.0 \quad \text{Formula (2)}$$

where [Al], [Ti], and [Mn] mean an amount of each component by mass % with respect to the total mass of the weld metal.

2. The automobile undercarriage part according to claim 1,
wherein the chemical composition of the weld metal contains, with respect to the total mass of the weld metal, by mass %, one or more of:
Cu: 0.05% to 0.50%;
Cr: 0.05% to 1.5%;
Nb: 0.005% to 0.3%;
V: 0.005% to 0.3%;
Mo: 0.05% to 1.0%;
Ni: 0.05% to 2.5%; and
B: 0.0005% to 0.005%.

3. The automobile undercarriage part according to claim 1,
wherein a sheet thickness of the first steel sheet in which the fillet weld is to be formed on the end surface is 0.8 mm or more and 4.5 mm or less.

4. The automobile undercarriage part according to claim 1,
wherein a tensile strength of the first steel sheet and the second steel sheet is 780 MPa or lower.

5. An automobile undercarriage part comprising:
a welded joint in which a first steel sheet and a second steel sheet are overlapped and a fillet weld is formed between an end surface of the first steel sheet and a surface of the second steel sheet,
wherein a chemical composition of a weld metal that forms the welded joint contains, with respect to a total mass of the weld metal, by mass %:
C: 0.02% to 0.20%;
Si: more than 0% to less than 0.09%;
Mn: 0.3% to 2.0%;
Al: 0.002% to 0.30%;
Ti: 0.005% to 0.30%;
P: more than 0% to 0.015%;
S: more than 0% to 0.030%;
Cu: 0% to 0.50%;
Cr: 0% to 1.5%;
Nb: 0% to 0.3%;
V: 0% to 0.3%;
Mo: 0% to 1.0%;
Ni: 0% to 2.5%;
B: 0% to 0.005%; and
a remainder comprising iron and impurities, and
the following formula (1) and formula (2) are satisfied, $$[Al]+[Ti]>0.05 \qquad \text{Formula (1)}$$

$$7\times[Mn]-112\times[Ti]-30\times[Al]\leq 4.0 \qquad \text{Formula (2)}$$

where [Al], [Ti], and [Mn] mean an amount of each component by mass % with respect to the total mass of the weld metal.

* * * * *